United States Patent Office 3,697,386
Patented Oct. 10, 1972

3,697,386
METHOD OF ISOLATING TETRAOXANE BY AZEOTROPIC DISTILLATION AND CRYSTALLIZATION
Tadashi Iwai, Hayamamachi, Isshiki, Hisao Yamashina, and Teiitsu Takagi, Yokosuka, and Shoichi Adachi, Zushi-shi, Japan, assignors to Ube Industries Ltd., Yamaguchi-ken, Japan
No Drawing. Filed Mar. 10, 1971, Ser. No. 123,072
Claims priority, application Japan, Mar. 18, 1970, 45/22,303; June 9, 1970, 45/49,136; Dec. 1, 1970, 45/105,440
Int. Cl. B01d 3/36; C07d 21/00
U.S. Cl. 203—48                                      4 Claims

ABSTRACT OF THE DISCLOSURE

Tetraoxane is isolated from a system containing tetraoxane and an azeotropic solvent therefore selected from di-n-butyl ether, cumene, o-, m-, and p-chlorotoluene, di-isobutyl ketone, n-hexyl alcohol and cyclooctane by azeotropically distilling a mixture of the tetraoxane and the azeotropic solvent from the system and by crystallizing the tetraoxane from the distilled mixture.

---

The present invention relates to a method of isolating tetraoxane from a tetraoxane-containing system, more particularly relates to a method of isolating tetraoxane from a tetraoxane-containing system by way of azeotropic distillation and crystallization.

It has been known for some time, that tetraoxane, which recently is regarded as a valuable material for manufacturing polyacetal resin, is produced by heat-decomposition of polyoxymethylene having a high molecular weight. In view of economy, it is disadvantageous to utilize the high molecular weight polyoxymethylene, which is very expensive, as a raw material for producing the tetraoxane, which is a raw material for manufacturing the polyacetal resin. Accordingly, it is desirable that the tetraoxane is manufactured from a cheap raw material, for example, formaldehyde and paraformaldehyde. Along the above lines, Belgian Pat. No. 721626 had disclosed a method of manufacturing the tetraoxane from an aqueous solution of formaldehyde or paraformaldehyde. In the method of the Belgian Patent, the tetraoxane is produced through such a process that the aqueous solution of formaldehyde or paraformaldehyde is heated at a temperature of 40 to 200° C. in the presence of an acid catalyst and a solvent for extracting the resultant tetraoxane, and the resultant tetraoxane, which is contained in the system with a low concentration, is extracted by the solvent so as to separate from the system.

When a solvent having a boiling point lower than that of the tetraoxane is utilized for the extraction of the tetraoxane, the tetraoxane is isolated by evaporating the solvent from the extraction solution. In this procedure, however, the tetraoxane is contained in the remainder under a crude condition together with a small quantity of an impurity having a high boiling point. Therefore, in order to obtain pure tetraoxane, it is necessary that the remainder of the evaporation, that is, crude tetraoxane, is further purified by way of, for example, recrystallization.

This is one of the disadvantages of the conventional method for isolating the tetraoxane.

Also, when a solvent with a boiling point higher than that of the tetraoxane is utilized for dissolving same, and the tetraoxane is isolated by distillation from the solution, it is necessary to maintain the distilled teraoxane at a temperature higher than the melting point of the tetraoxane, usually about 120° C., so the distilled tetraoxane remains in a liquid form. Unfortunately, the distilled tetraoxane tends to spontaneously polymerize at the high temperature, as mentioned above. The tendency causes disadvantages, such as lowering the yield of pure tetraoxane and closing the conduit for transferring the distilled tetraoxane. When tetraoxane is polymerized into a polyacetal resin, the above undesirable tendencies are found also in a recovery step of tetraoxane wherein the remaining tetraoxane after the polymerization is dissolved into an organic solvent and then isolated from the solution.

It is an object of the present invention to provide a method of isolating the tetraoxane from a tetraoxane-containing system without the above-mentioned disadvantages.

It is another object of the present invention to provide a method of isolating tetraoxane from a tetraoxane-containing system with a high yield.

It is a further object of the present invention to provide a method of isolating tetraoxane from a tetraoxane-containing system in a continuous manner.

The above-mentioned and other objects are accomplished by the method of the present invention. According to the method of the present invention, a primary tetraoxane-containing mixture, which contains an azeotropic solvent for the tetraoxane selected from the group consisting of di-n-butyl ether, cumene, o, m and p-chlorotoluene, di-isobutyl ketone, n-hexyl alcohol and cyclooctane, is prepared, the primary tetraoxane-containing is subjected to azeotropic distillation of a mixture of the tetraoxane and the azeotropic solvent, and then the distilled mixture is subjected to crystallization of the tetraoxane, whereby the tetraoxane of a high purity is isolated at a high efficiency without difficulty.

The azeotropic solvents usable for the method of the present invention have the physical properties as illustrated in the table.

TABLE

| Solvent | Melting point (° C.) | Boiling point (° C.) | Solubility for tetraoxane * (g.) at temperature of— | | Azeotropic temperature (° C.) | Content of tetraoxane in azeotropic mixture (percent) |
|---|---|---|---|---|---|---|
| | | | 20° C. | 100° C. | | |
| Di-n-butyl ether | −95.2 | 142.0 | 0.7 | 32 | 140 | 20 |
| Cumene | −96.9 | 152.4 | 1.5 | 100 | 150 | 10 |
| o-Chlorotoluene | −36.5 | 159.2 | 1.8 | 140 | 156 | 18 |
| m-Chlorotoluene | −47.8 | 161.6 | 1.9 | 140 | 156 | 18 |
| p-Chlorotoluene | 7.8 | 162.4 | 5 | 120 | 160 | 20 |
| Di-isobutyl ketone | −46.0 | 168.1 | 2.1 | 24.2 | 154 | 18 |
| n-Hexyl alcohol | −51.6 | 157.5 | 0.9 | 23.0 | 153 | 12 |
| Cyclooctane | 14.4 | 151 | 0.45 | 24 | 146 | 27 |

*The solubility was expressed by gram number of tetraoxane dissolved in 100 g. of the solvent.

The primary mixture containing the tetraoxane and the azeotropic solvent may be prepared by the addition of the azeotropic solvent into the tetraoxane-containing system such as a final result of the tetraoxane manufacturing process, and a remainder of a process for separating a tetraoxane-polymerization product from the polymerization system; or by the previous addition of the azeotropic solvent into the tetraoxane-manufacturing or polymerizing system.

In the performance of the method of the present invention, organic solvents such as o-nitrotoluene, 1,2,3-trichlorobenzene, cyclohexane, n-heptane, chloroform, benzene and xylene may exist in the primary mixture as a reaction solvent for manufacturing or polymerizing the tetraoxane or a solvent for extracting the tetraoxane from the tetraoxane-containing mixture. In this case, it is preferable that the reaction solvents or the extraction solvent has a boiling point higher than the distillation temperature to be applied to the primary mixture. In the case when the boiling point of the reaction or extraction solvent is lower than the distillation temperature, the solvent having the lower boiling point is firstly evaporated from the primary mixture followed by the azeotropic distillation for the tetraoxane and the azeotropic solvent.

The azeotropic solvents usable for the method of the present invention may be used as a simple solvent or as a mixture of two or more. Further, the primary mixture containing the azeotropic solvent and the tetraoxane may be further mixed with another solvent which is capable of azeotropically distilling together with the mixture of the azeotropic solvent and the tetraoxane.

The azeotropic solvent is selected in consideration of composition of the tetraoxane-containing system and kind of impurity in the mixture.

The azeotropic solvent may be mixed with the tetraoxane-containing system with an optionally determined quantity thereof. However, it is preferable that the addition quantity of the azeotropic solvent is determined in consideration of concentration of tetraoxane in the tetraoxane-containing system, solubility of tetraoxane in the azeotropic solvent and equilibrium condition between gaseous phase and liquid phase during distillation, so as to become economical.

Further, it is very valuable for continuously carrying out the isolating of the tetraoxane with high efficiency, that after the tetraoxane is crystallized from the azeotropically distilled liquid mixture followed by filtration of the crystallized tetraoxane, the filtrate which contains a small quantity of the tetraoxane is recycled into the primary mixture.

The azeotropic solvent may be mixed with the tetraoxane-containing system at any time. Usually, the azeotropic solvent is added to the system just before the azeotropic distillation. As far as the azeotropic solvent does not have any obstacle effect for manufacturing or polymerizing the tetraoxane, it may be previously added at the manufacturing or polymerizing step of the tetraoxane.

The azeotropic distillation, according to the present invention, is preferably carried out under such a condition that the distilled liquid mixture is an azeotropic mixture. In consideration of heat quantity required for the distillation, it sometimes is economical for the distilled liquid mixture to have a content of the tetraoxane lower that in the azeotropic mixture. That is, even if the content of the tetraoxane in the distilled liquid mixture is lower than that of the azeotropic mixture, when the tetraoxane content in the distilled liquid mixture is higher than that in the primary mixture and sufficient for crystallizing the tetraoxane by cooling and distilled liquid mixture, the method of the present invention can be actually effected.

The azeotropic distillation may usually be carried out under normal pressure or reduced pressure conditions, and rarely under a pressurized condition.

According to the method of the present invention, the tetraoxane is prevented from the undesired polymerization obstacle, which frequently occurs in the conventional simple distillation of the tetraoxane. Consequently, the recovery percentage of the tetraoxane increase as opposed to that of the conventional method. Particularly, the method of the present invention is very valuable for isolating the tetraoxane from a mixture containing same with a low concentration thereof.

The following examples are merely to concretely illustrate the present invention.

EXAMPLE 1

40 ml. of a solution containing 2.00 g. of tetraoxane in o-nitrotoluene was mixed with 10 ml. of di-n-butyl ether in order to prepare a primary mixture.

The primary mixture was charged into a 100 ml. flask, and a distillation column being filled with a number of glass rings and having an inside diameter of 10 mm. and a length of 200 mm. was connected with the flask. A top outlet was connected to a top inlet of a Liebig condenser, and a silicon oil of a temperature of 80° C. was flowed through a jacket of the condenser. The primary mixture was azeotropically distilled at a temperature of 140 to 142° C. which is measured at the top portion of the distillation column. 8.9 g. of a liquid mixture containing the tetraoxane and di-n-butyl ether was obtained. The liquid mixture was cooled to a temperature of 10° C. so as to crystallize the tetraoxane, the resultant crystals were separated from the di-n-butyl ether by way of filtration and then dried in a vacuum at room temperature. The yield amounted to 1.36 g. of pure crystalline tetraoxane. This corresponded to a yield of 68% based on the tetraoxane content of the primary mixture.

EXAMPLE 2

The distillation apparatus similar to that of Example 1 was utilized except that a collector for the distilled liquid provided with a jacket through which water of 10° C. was flowed and a glass filter disposed at a lower portion of the collector was connected to the bottom outlet of the Liebig condenser and that a bottom of the collector was connected to the distillation flask through a U-shaped conduit. 40 ml. of a solution containing 1.00 g. of tetraoxane in o-nitrotoluene was mixed with 10 ml. of di-n-butyl ether in order to prepare a primary mixture. The primary mixture was charged into the above-mentioned distillation apparatus and then azeotropically distilled under the same conditions as that of Example 1. The distilled liquid, which was a mixture of the tetraoxane and the di-n-butyl ether, was cooled to a temperature of 10° C. in the collector so as to crystallize the tetraoxane. The crystallized tetraoxane was filtered through the glass filter and the filtrate was recycled into the distillation flask through the U-shaped conduit. After the distillation was continued for 30 minutes, the crystalline tetraoxane isolated in the collector was dried in a vacuum at room temperature. The yield of the pure crystalline tetraoxane was 0.92 g. This corresponded to a yield of 92% based on the tetraoxane content of the primary mixture.

EXAMPLE 3

Through the same procedure as that of Example 1, a primary mixture consisting of 40 ml. of a solution containing 2.00 g. of tetraoxane in o-nitrotoluene and 10 ml. of cumene was azeotropically distilled at a temperature of 150 to 152° C. which measured at a top portion of the distillation column. 10.2 g. of liquid mixture of the tetraoxane and the cumene was obtained. The distilled liquid mixture resulted in 1.06 g. of crystalline tetraoxane through the same procedure as that of Example 1. This corresponds to a yield of 53% based on the tetraoxane content in the primary mixture.

EXAMPLE 4

The same primary mixture as that of Example 3 was azeotropically distilled by means of the same apparatus as that of Example 2. After the distillation was kept for 30 minutes, the resultant crystalline tetraoxane was isolated and dried in a vacuum at room temperature. 1.76 g. of pure crystalline tetraoxane was obtained. This corresponds to a yield of 88% based on the tetraoxane content in the primary mixture.

EXAMPLE 5

A primary mixture consisting of a mixture of 2.00 g. of tetraoxane and 40 g. of 1,2,3,-tri-chlorobenzene and 10 ml. of p-chlorotoluene was azeotropically distilled by means of the same apparatus as that of Example 1 at a temperature of 164° C. to 167° C. which was measured at a top portion of the distillation column. Through the distillation, 13.3 g. of liquid mixture was obtained. By the same treatment as that of Example 1, 1.62 g. of crystalline tetraoxane was obtained from the liquid mixture. This corresponds to a yield of 81% based on the original tetraoxane content in the primary mixture.

EXAMPLE 6

The same apparatus as that of Example 1 was utilized by circulating a silicone oil of 40° C. through the jacket of the Liebig condenser. The same primary composition as used in Example 5 was distilled by the above-mentioned apparatus under a reduced pressure of 60 to 61 mm. Hg at a temperature of 77 to 78° C. which was measured at a top portion of the distillation column. The distilled liquid mixture amounted to 10.7 g., and resulted in 1.66 g. of crystalline tetraoxane through the same procedure as stated in Example 1. This corresponds to a yield of 83% based on the tetraoxane content of the primary mixture.

EXAMPLE 7

5 g. of crystalline tetraoxane was radiated with a $\gamma$-rays with a dosage of $10^6$ roentgen at room temperature and then heated to a temperature of 105° C. for 1 hour in order to polymerize. The result was mixed with 30 ml. of di-n-butyl ether. The primary mixture thus prepared was azeotropically distilled under a reduced pressure of 100 mm. Hg for 30 minutes using the same apparatus and manner as utilized in Example 2 while flowing nitrogen gas therethrough. Through the same procedure as used in Example 2, 2.23 g. of crystalline tetraoxane was recovered. The remainder in the flask was filtered, and the residue was washed with acetone and then dried in a vacuum at room temperature. The result was 2.58 g. of a polymerized tetraoxane.

EXAMPLE 8

A primary mixture was prepared from 40 ml. of a solution containing 1.02 g. of tetraoxane in o-nitrotoluene and 10 ml. of di-isobutyl ketone. The primary mixture was azeotropically distilled in the same distillation apparatus and manner as those of Example 1 at a temperature of 148 to 157° C. which was measured at a top portion of the distillation column. This resulted in 7.86 g. of a distilled liquid mixture. The distilled liquid mixture was cooled to a temperature of 10° C. so as to separate tetraoxane crystals, followed by filtration and drying in a vacuum at room temperature. Purified tetraoxane was obtained with a yield of 0.84 g. which corresponds to a yield of 83% based on the content in the primary mixture.

EXAMPLE 9

A primary mixture consisting of 1.01 g. of tetraoxane, 42.0 g. of 1,2,3-trichlorobenzene and 8.16 g. of n-hexyl alcohol was azeotropically distilled using the same apparatus and manner as those of Example 1 at a temperature of 148 to 156° C. which was measured at a top portion of the distillation column. Through the distillation, 8.71 g. of liquid mixture was obtained. The obtained mixture was subjected to the isolating procedure as indicated in Example 1 to obtain 0.74 g. of purified crystalline tetraoxane. The yield corresponds to a percentage of 73 with respect to the original content of tetraoxane in the primary mixture.

EXAMPLE 10

A primary mixture consisting of 40 ml. of a solution containing 1.00 g. of tetraoxane in o-nitrotoluene and 10 ml. of di-isobutyl ketone was azeotropically distilled and thus, 0.91 g. of crystalline tetraoxane was isolated from the distillation result by utilizing the same apparatus and manner as those of Example 2. In the procedure, the filtrate which mainly contains di-isobutyl ketone was recycled into the distillation flask so as to mix with the remainder in the flask. The yield of the crystalline tetraoxane corresponds to a recovery percentage of 91 with respect to the tetraoxane content in the primary mixture.

EXAMPLE 11

5 g. of crystalline tetraoxane was exposed to a radiation of $\gamma$-rays with a dosage of $10^6$ roentgen at room temperature and then heated to a temperature of 105° C. for 1 hour for polymerizing. The result was mixed with 30 ml. of di-isobutyl ketone. The primary mixture thus prepared was azeotropically distilled by using the same apparatus as stated in Example 2 under a reduced pressure of 100 mm. Hg for 30 minutes while flowing nitrogen therethrough. The distilled liquid mixture resulted in 2.12 g. of crystallized tetraoxane through the same procedure as that of Example 2. After the distillation, the remainder in the flask was filtered and the residue was washed with acetone and then dried in a vacuum at room temperature. 2.65 g. of a polymer was obtained.

EXAMPLE 12

A primary mixture consisting of 60 ml. of a solution containing 1.00 g. of tetraoxane in nitrobenzene and 30 ml. of cyclooctane was azeotropically distilled by using the same apparatus and manner as those of Example 1 except that a silicone oil of a temperature of approximately 100° C. flowed through the jacket of the condenser and the temperature of the distillation column's top portion was in a range from 148 to 150° C. 30 ml. of liquid mixture was obtained through the above distillation followed by cooling to a temperature of 20° C. so as to crystallize the tetraoxane therein. The crystallized tetraoxane was separated by way of filtration and then dried in a vacuum at room temperature. 0.82 g. of pure tetraoxane was obtained. The yield corresponds to a recovery percentage of 82 based on the original content of the tetraoxane in the primary mixture.

EXAMPLE 13

A primary mixture consisting of 1.01 g. of tetraoxane, 1.02 g. of trioxane, 25 ml. of cyclohexane and 25 ml. of cyclooctane was subjected to the following azeotropic distillation using the same apparatus as those of Example 1.

In an initial period, the distillation was carried out at a temperature of the column's top portion of 75 to 80° C. while flowing warm water of a temperature of 40° C. through the jacket of the condenser, through which 23 ml. of liquid mixture which consisted of the cyclohexane and the trioxane, was obtained. In a final period, the distillation was performed at a temperature of the column's top portion of 145 to 150° C. while flowing a silicone oil of a temperature of 120° C. through the condenser's jacket, by which about 10 ml. of liquid mixture was obtained. The finally obtained liquid mixture was cooled to a temperature of 20° C. The crystals formed by the above cooling were separated by way of filtration and dried in a vacuum at room temperature. 0.94 g. of crystals was obtained. It was recognized through a gas chromatographic analysis and a determination of the melting point, that the crystals were composed of pure tetraoxane containing no trioxane. The yield of the tetraoxane corresponds to a recovery percentage of 93 with respect to the original content thereof in the primary mixture.

What we claim is:

1. A method of isolating tetraoxane from a tetraoxane-containing system comprising preparing a primary tetraozane-mixture containing an azeotropic solvent of said tetraoxane selected from the group consisting of di-n-butyl ether, cumene, o, m and p-chlorotoluene, di-isobutyl ketone, n-hexyl alcohol and cyclooctane, azeotropically distilling a mixture of said tetraoxane and said azeotropic solvent from said primary mixture, and crystallizing said tetraoxane from said distilled mixture.

2. A method as claimed in claim 1, wherein said distillation is carried out under normal pressure conditions.

3. A method as claimed in claim 1, wherein said distillation is carried out under a reduced pressure condition.

4. A method as claimed in claim 1, wherein said crystallized tetraoxane is filtered from said distilled mixture followed by recycling said remaining azeotropic solvent into said primary mixture.

References Cited

UNITED STATES PATENTS

| | | | |
|---|---|---|---|
| 3,426,041 | 2/1969 | Miyake et al. | 260—340 |
| 2,465,489 | 3/1949 | Sokol | 203—48 |

OTHER REFERENCES

Staudinger, Helv. Chim. Acta, vol. 8 (1925), pp. 65–67.

Derwent Abstract—Belgian Pat. Rep. # 14/69, Belg. Pat. 721,626—rept. issued May 7, 1969.

WILBUR L. BASCOMB, JR., Primary Examiner

U.S. Cl. X.R.

203—62, 63, 67, 68, 69; 260—340